United States Patent
Yang et al.

(10) Patent No.: US 12,500,650 B2
(45) Date of Patent: Dec. 16, 2025

(54) METHOD AND USER EQUIPMENT FOR BEAM FAILURE RECOVERY

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 608 days.

(21) Appl. No.: 17/161,949

(22) Filed: Jan. 29, 2021

(65) Prior Publication Data
US 2021/0153074 A1    May 20, 2021

Related U.S. Application Data

(63) Continuation of application No. PCT/CN2019/096509, filed on Jul. 18, 2019.

(30) Foreign Application Priority Data

Aug. 1, 2018    (CN) .......................... 201810866890.2

(51) Int. Cl.
H04B 7/06    (2006.01)
H04W 28/04    (2009.01)
(Continued)

(52) U.S. Cl.
CPC ........ H04B 7/06964 (2023.05); H04W 28/04 (2013.01); H04W 36/0055 (2013.01);
(Continued)

(58) Field of Classification Search
CPC ............. H04W 28/04; H04W 36/0055; H04W 36/0011; H04W 74/0833; H04W 74/004;
(Continued)

(56) References Cited

U.S. PATENT DOCUMENTS

2016/0353510 A1    12/2016  Zhang et al.
2018/0138962 A1*   5/2018  Islam .................... H04L 5/0032
(Continued)

FOREIGN PATENT DOCUMENTS

CN    107005858 A    8/2017
CN    107079459 A    8/2017
(Continued)

OTHER PUBLICATIONS

Ericsson: "Prioritization in MAC", 3GPP Draft; R2-1707120—Prioritization in MAC, 3rd Generation Partnership Project (3GPP), Mobile Competence Centre ; 650, Route Des Lucioles ; F-06921 Sophia-Antipolis Cedex ; France, vol. RAN WG2, No. Qingdao; Jun. 27, 2017-Jun. 29, 2017 Jun. 26, 2017 (Jun. 26, 2017), XP051301613, Retrieved from the Internet: URL:http://www.3gpp.org/ftp/Meetings_3GPP SYNC/RAN2/Docs/.
(Continued)

Primary Examiner — Stephen J Clawson
(74) Attorney, Agent, or Firm — BROOKS KUSHMAN P.C.

(57) ABSTRACT

The present disclosure discloses a method and a user equipment for beam failure recovery. The method includes: when the user equipment detects on an active bandwidth part (active BWP) an occurrence of a beam failure event, and
(Continued)

when the terminal device detects on an active BWP an occurrence of a beam failure event, and CORESET-BFR is not configured on the active BWP, sending a BFRQ by using a target channel resource ~ S210 control resource set-beam failure recovery (CORESET-BFR) is not configured on the active BWP, sending a beam failure recovery request (BFRQ) by using a target channel resource.

18 Claims, 3 Drawing Sheets

(51) Int. Cl.
*H04W 36/00* (2009.01)
*H04W 76/18* (2018.01)
*H04W 74/0833* (2024.01)
*H04W 74/0838* (2024.01)

(52) U.S. Cl.
CPC ........ *H04W 76/18* (2018.02); *H04W 74/0833* (2013.01); *H04W 74/0838* (2024.01)

(58) Field of Classification Search
CPC ............... H04W 74/006; H04W 76/18; H04W 72/0453; H04W 72/046; H04W 36/0064; H04W 36/13
See application file for complete search history.

(56) References Cited

U.S. PATENT DOCUMENTS

| | | | |
|---|---|---|---|
| 2018/0183551 A1 | 6/2018 | Chou et al. | |
| 2018/0205585 A1 | 7/2018 | Sadiq et al. | |
| 2018/0219604 A1 | 8/2018 | Lu et al. | |
| 2019/0215888 A1* | 7/2019 | Cirik | H04W 72/0446 |
| 2019/0306850 A1* | 10/2019 | Zhang | H04B 7/0626 |
| 2019/0357262 A1* | 11/2019 | Cirik | H04L 5/001 |
| 2020/0100311 A1* | 3/2020 | Cirik | H04W 72/23 |
| 2020/0304218 A1 | 9/2020 | Gao et al. | |
| 2020/0336928 A1* | 10/2020 | Seo | H04W 72/56 |
| 2020/0367308 A1 | 11/2020 | Chen et al. | |
| 2021/0029745 A1* | 1/2021 | Zhang | H04W 80/02 |
| 2021/0068162 A1* | 3/2021 | Agiwal | H04L 41/0668 |

FOREIGN PATENT DOCUMENTS

| | | |
|---|---|---|
| CN | 107342801 A | 11/2017 |
| CN | 107612602 A | 1/2018 |
| CN | 108093481 A | 5/2018 |
| CN | 108111286 A | 6/2018 |
| CN | 108260212 A | 7/2018 |
| WO | 2018012930 A1 | 1/2018 |
| WO | 2018085145 A1 | 5/2018 |
| WO | 2018128426 A1 | 7/2018 |
| WO | 20180129300 A1 | 7/2018 |

OTHER PUBLICATIONS

Huawei et al: "Configuration of priority order between data and MAC CE", 3GPP Draft; R2-1705566 Configuration of Priority Order Between Data and MAC CE, 3rd Generation Partnership Project (3GPP), Mobile Competence Centre; 650, Route Des Lucioles; F-06921 Sophia-Antipolis, vol. RAN WG2, No. Hangzhou, China; May 15, 2017-May 19, 2017 May 7, 2017 (May 7, 2017), XP051265123, Retrieved from the Internet: URL:http://www.3gpp.org/ftp/tsg_ran/WG2_RL2/TSGR2_98/Docs/.

Vivo: "Remaining issues on mechanism to 1-15 recover from beam failure", 3GPP Draft; RI-1803818 Remaining Issues on Mechanism to Recover From Beam Failure, 3rd Generation Partnership Project (3GPP), Mobile Competence Centre ; 650, Route Des Lucioles ; F-06921 Sophia-Antipo, vol. RAN WGI, No. Sanya, China; Apr. 16, 2018-Apr. 20, 2018 Apr. 15, 2018 (Apr. 15, 2018), XP051426113, Retrieved from the Internet: URL: http://www.3gpp.org/ftp/M eetings%5F3GPP%5FSYNC/RAN1/Docs/.

Dedicated resource configuration for beam failure recovery R2-1712959, Dated Nov. 27-Dec. 1, 2017, 3 Pages.

R1-1712007, 3 Pages.

R1-1807796, Summary 2 on Remaing issues on Beam Failure Recovery, Dated—May 21-May 25, 2018, 29 Pages.

R2-1713806, BWPs for random access in connected mode, Dated Nov. 27-Dec. 1, 2017, 3 Pages.

Remaining issues on beam failure recovery R1-1806395, Dateed May 21-May 25, 2018, 5 Pages.

Search Report Application No. 201810866890.2, Dated Apr. 17, 2020, 8 pages and 5 pages of Translation.

The First Office Action received from the State IP office of People's Republic of China, Application No. 201810866860.2, Dated Nov. 3, 2020, 13 Pages and 15 Pages of Translation.

Written Opinion and International Search Report received for PCT/CN2019/096506, Feb. 11, 2021, 8 Pages and 6 Pages of Translation.

The First Office Action received from the State IP office of People's Republic of China, Application No. 201810866890.2, Dated Nov. 3, 2020, 13 Pages and 15 Pages of Translation.

First Office Action for Korean Application No. 10-2021-7006077, dated Feb. 28, 2024, 6 Pages.

MediaTek Inc. "Remaining Issues on Beam Failure Recovery" 3GPP TSG RAN WG1 Meeting #93, Busan, South Korea, May 2018, R1-1806789, 4 Pages.

* cited by examiner

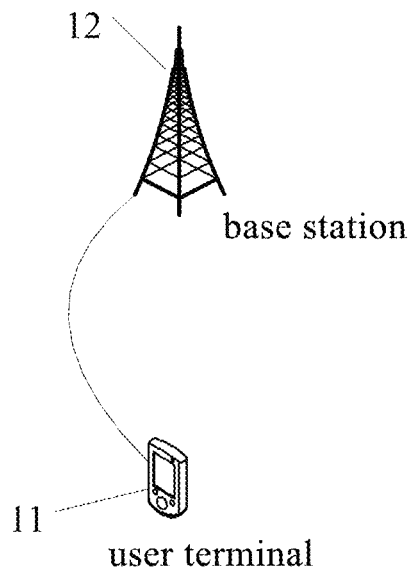

base station user terminal

Fig.1 when the terminal device detects on an active BWP an occurrence of a beam failure event, and CORESET-BFR is not configured on the active BWP, sending a BFRQ by using a target channel resource — S210

Fig.2 when the terminal device detects on an active BWP an occurrence of a beam failure event, and PRACH is not configured on the active BWP, sending a BFRQ by using a target channel resource — S310

Fig.3 monitoring CORESET-BFR on a first cell, wherein a type of a recovery search space on the CORESET-BFR is a target type — S410

Fig.4

METHOD AND USER EQUIPMENT FOR BEAM FAILURE RECOVERY

CROSS-REFERENCE TO RELATED APPLICATION

The present application is a continuation application of International Application No. PCT/CN2019/096509 filed on Jul. 18, 2019, which claims priority of Chinese Patent Application No. 201810866890.2 filed on Aug. 1, 2018, both of which are incorporated herein by reference in their entireties.

TECHNICAL FIELD

The present disclosure relates to the field of communications technology, and in particular to a method and a user equipment for beam failure recovery.

BACKGROUND

The fifth-generation (5G) mobile communication system New Radio (NR) introduces large-scale antenna technology, which can better support Multi-User Multiple-Input Multiple-Output (MU-MIMO) antenna technology. In order to reduce the equipment cost and baseband processing complexity caused by the large-scale antenna array, the hybrid digital-analog beamforming technology is used to achieve relatively rough matching between the transmitted signal and the channel.

However, in the hybrid digital-analog beamforming technology, if a control resource set for beam failure recovery (Control Resource Set-Beam Failure Recovery, CORESET-BFR) is not configured on the active Bandwidth Part (active BWP), or a Physical Random Access Channel (PRACH) is not configured on the active BWP, there is still a lack of corresponding solutions for beam failure recovery.

SUMMARY

An object of the embodiments of the present disclosure is to provide a method and a user equipment for beam failure recovery to solve the problem in the related art that beam failure recovery cannot be achieved when CORESET-BFR is not configured on the active BWP or a PRACH is not configured on the active BWP.

In a first aspect, an embodiment of the present disclosure provides a method for beam failure recovery applied to a user equipment, and the method includes:
  when the user equipment detects on an active BWP an occurrence of a beam failure event, and CORESET-BFR is not configured on the active BWP, sending a BFRQ by using a target channel resource.

In a second aspect, an embodiment of the present disclosure further provides a method for beam failure recovery applied to a user equipment, and the method includes:
  when the user equipment detects on an active BWP an occurrence of a beam failure event, and a PRACH is not configured on the active BWP, sending a BFRQ by using a target channel resource.

In a third aspect, an embodiment of the present disclosure further provides a method for beam failure recovery applied to a user equipment, and the method includes:
  monitoring CORESET-BFR on a first cell, wherein a type of a recovery search space on the CORESET-BFR is a target type.

In a fourth aspect, an embodiment of the present disclosure further provides a user equipment which includes:
  a sending module configured to, when the user equipment detects on an active BWP an occurrence of a beam failure event and CORESET-BFR is not configured on the active BWP, send a BFRQ by using a target channel resource.

In a fifth aspect, an embodiment of the present disclosure further provides a user equipment which includes a processor, a storage, and a computer program stored on the storage and capable of running on the processor, the computer program implementing, when executed by the processor, the steps of the method for beam failure recovery according to the first aspect.

In a sixth aspect, an embodiment of the present disclosure further provides a computer readable storage medium, wherein the computer readable storage medium has a computer program stored thereon, and the computer program implements, when executed by a processor, the steps of the method for beam failure recovery according to the first aspect.

In a seventh aspect, an embodiment of the present disclosure further provides a user equipment which includes:
  a sending module configured to, when the user equipment detects on an active BWP an occurrence of a beam failure event, and a PRACH is not configured on the active BWP, send a BFRQ by using a target channel resource.

In an eighth aspect, an embodiment of the present disclosure further provides a user equipment which includes a processor, a storage, and a computer program stored on the storage and capable of running on the processor, the computer program implementing, when executed by the processor, the steps of the method for beam failure recovery according to the second aspect.

In a ninth aspect, an embodiment of the present disclosure further provides a computer readable storage medium, wherein the computer readable storage medium has a computer program stored thereon, and the computer program implements, when executed by a processor, the steps of the method for beam failure recovery according to the second aspect.

In a tenth aspect, an embodiment of the present disclosure further provides a user equipment which includes:
  a monitor module configured to monitor CORESET-BFR on a first cell, wherein a type of a recovery search space on the CORESET-BFR is a target type.

In an eleventh aspect, an embodiment of the present disclosure further provides a user equipment which includes a processor, a storage, and a computer program stored on the storage and capable of running on the processor, the computer program implementing, when executed by the processor, the steps of the method for beam failure recovery according to the third aspect.

In a twelfth aspect, an embodiment of the present disclosure further provides a computer readable storage medium, wherein the computer readable storage medium has a computer program stored thereon, and the computer program implements, when executed by a processor, the steps of the method for beam failure recovery according to the third aspect.

In the embodiments of the present disclosure, when the user equipment detects on an active BWP an occurrence of a beam failure event and CORESET-BFR is not configured on the active BWP, the user equipment uses a target channel resource to quickly send a BFRQ, thereby achieving beam failure recovery when the CORESET-BFR or PRACH is not configured on the active BWP, and ensuring the recovery of data transmission.

BRIEF DESCRIPTION OF THE DRAWINGS

The drawings described here are used to provide a further understanding of the present disclosure and constitute a part of the present disclosure. The exemplary embodiments of the present disclosure and descriptions thereof are used to explain the present disclosure, and not constitute an improper limitation of the present disclosure. In the drawings:

FIG. 1 is a schematic diagram of a network architecture provided by an embodiment of the present disclosure;

FIG. 2 is a flow diagram of a method for beam failure recovery provided by an embodiment of the present disclosure;

FIG. 3 is a flow diagram of another method for beam failure recovery provided by an embodiment of the present disclosure;

FIG. 4 is a flow diagram of another method for beam failure recovery provided by an embodiment of the present disclosure;

DETAILED DESCRIPTION

Figure 5:
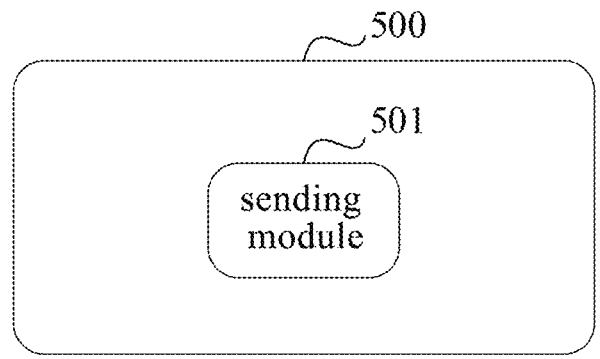
FIG. 5 is a structural diagram of a user equipment provided by an embodiment of the present disclosure.

Hereinafter, the technical solutions in the embodiments of the present disclosure will be described clearly and thoroughly in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts should fall within the protection scope of the present disclosure.

Referring to FIG. 1, it is a schematic diagram of a network architecture provided by an embodiment of the present disclosure, as shown in FIG. 1, including a user terminal 11 and a base station 12, wherein the user terminal 11 may be a User Equipment (UE), for example, a terminal-side equipment such as a mobile, a tablet personal computer, a laptop computer, a personal digital assistant (PDA), a mobile internet device (MID), or a wearable device, etc. It should be noted that the specific type of the user terminal 11 is not limited in the embodiments of the present disclosure. The above base station 12 may be a 5G base station and a future version of base station (e.g., gNB, 5G NR NB), or a base station in other communication systems, or may be called as a node B. It should be noted that, in the embodiments of the present disclosure, only a 5G base station is taken as an example, but the specific type of the base station 12 is not limited.

It should be noted that, the specific functions of the above user terminal 11 and the base station 12 will be described in detail by using the following several embodiments.

FIG. 2 is a flow diagram of a method for beam failure recovery provided by an embodiment of the present disclosure. The method is applied to a user equipment, and the method may be as follows:

Step 210, when the user equipment detects on an active BWP an occurrence of a beam failure event, and CORESET-BFR is not configured on the active BWP, sending a Beam Failure Recovery Request (BFRQ) by using a target channel resource.

In practical applications, a network side equipment configures a beam failure detection reference signal (BFD RS) for the user equipment, so that the user equipment can determine whether a beam failure event occurs by measuring the BFD RS at the physical layer.

If the user equipment detects on the active BWP an occurrence of a beam failure event, and the network side equipment does not configure the CORESET-BFR for the active BWP, at this time the user equipment send a BFRQ to the network side equipment by using a target channel resource, in order to recovery data transmission as soon as possible.

In an embodiment of the present disclosure, the target channel resource is a channel resource other than a contention-free physical random access channel (PRACH).

Since the network side equipment does not configure the CORESET-BFR for the active BWP, the user equipment does not use on the active BWP the contention-free PRACH to send the BFRQ to the network side equipment regardless of whether the network side equipment configures the contention-free PRACH for the active BWP.

The forms of target channel resource include at least the following three types.

Type 1:

In an embodiment of the present disclosure, when a contention-free PRACH is configured on the active BWP, the target channel resource is the contention-free PRACH.

If the network side equipment does not configure the CORESET-BFR for the active BWP, but configures a contention-based PRACH for the active BWP, at this time, the user equipment uses on the active BWP the contention-based PRACH to send a BFRQ to the network side equipment.

In an embodiment of the present disclosure, the method further includes:

receiving, on the active BWP, a random access response (RAR).

After receiving the BFRQ sent on the active BWP by the user equipment using the contention-based PRACH, the network side equipment returns the RAR to the user equipment, so that the user equipment can reconnect to the network side equipment after receiving the RAR, thereby achieving the beam failure recovery and making data transmission recovery possible.

Type 2:

In an embodiment of the present disclosure, the method further includes:

switching to an initial bandwidth part (initial BWP).

In practical applications, the initial BWP is a BWP configured for the user equipment by the network side equipment and used when the user equipment initially accesses to the network side equipment.

Since the network side equipment does not configure the CORESET-BFR for the active BWP, the user equipment may switch from the active BWP to the initial BWP, thereby achieving beam failure recovery on the initial BWP.

In an embodiment of the present disclosure, when the CORESET-BFR is configured on the initial BWP, and a contention-free PRACH is configured on the initial BWP, the target channel resource is the contention-free PRACH.

If the network side equipment configures both the CORESET-BFR and the contention-free PRACH for the initial BWP, at this time, the user equipment uses on the initial BWP the contention-free PRACH to send the BFRQ to the network side equipment.

In an embodiment of the present disclosure, the method further includes:

monitoring, on the initial BWP, the CORESET-BFR.

After receiving the BFRQ sent on the initial BWP by the user equipment using the contention-free PRACH, the network side equipment sends, on the CORESET-BFR configured for the initial BWP, response information for the beam failure recovery request to the user equipment by using a dedicated PDCCH on the CORESET-BFR.

The user equipment monitors, on the initial BWP, the CORESET-BFR, and if it receiving the response information for the beam failure recovery request sent by the network side equipment, the beam failure recovery is successful, thereby recovering data transmission.

In an embodiment of the present disclosure, a type of a recovery search space on the CORESET-BFR is UE-specific.

In an embodiment of the present disclosure, the type of the recovery search space on the CORESET-BFR is common.

In one embodiment, the network side equipment configures the CORESET-BFR for the initial BWP, and the type of the recovery search space on the CORESET-BFR can only be configured as UE-specific.

In another embodiment, the network side equipment configures the CORESET-BFR for the initial BWP, and the type of the recovery search space on the CORESET-BFR may be selected from UE-specific and common so that the type of the recovery search space on the CORESET-BFR is configured as either UE-specific or common.

In an embodiment of the present disclosure, the method further includes:

monitoring target radio network temporary identity (RNTI), wherein the target RNTI includes: cell radio network temporary identity (C-RNTI).

The network side equipment uses a dedicated PDCCH on the CORESET-BFR to send Downlink Control Information (DCI) to the user equipment, wherein the DCI is the response information for the beam failure recovery request. When sending this DCI, the network side equipment will use a certain RNTI to scramble the Cyclic Redundancy Check (CRC) in the DCI. The user equipment monitors the RNTI that may be used by the network side equipment (target RNTI), and uses the target RNTI to descramble the received DCI.

Wherein the target RNTI is one or more RNTIs including C-RNTI.

In one embodiment, if the type of the recovery search space on the CORESET-BFR is UE-specific, the target RNTI does not includes: Configured Scheduling RNTI (CS-RNTI), Temporary Cell RNTI (TC-RNTI), Semi-Persistent Channel State Information RNTI (SP-CSI-RNTI).

If the network side equipment configures the type of the recovery search space on the CORESET-BFR as UE-specific, at this time, for the DCI that is sent, as the response information for the beam failure recovery request, to the user equipment by the network side equipment using the dedicated PDCCH on the CORESET-BFR, the network side equipment will not use CS-RNTI, TC-RNTI, or SP-CSI-RNTI to scramble the CRC in the DCI. Therefore, the user equipment monitors C-RNTI, but does not monitor CS-RNTI, TC-RNTI, and SP-CSI-RNTI.

It should be noted that, in addition to monitoring C-RNTI and not monitoring CS-RNTI, TC-RNTI, SP-CSI-RNTI, the user equipment may also perform monitoring on one or more of other RNTIs, which is not specifically limited here.

Among them, other RNTIs include at least one of the following: Random Access RNTI (RA-RNTI), Paging RNTI (P-RNTI), System Information RNTI (SI-RNTI), Interruption RNTI (INT-RNTI), Slot Format Indication RNTI (SFI-RNTI), Transmit Power Control Sounding Reference Symbols RNTI (TPC-SRS-RNTI), Inactive RNTI (I-RNTI).

In another embodiment, if the type of the recovery search space on the CORESET-BFR is common, the target RNTI does not includes: CS-RNTI, TC-RNTI, SP-CSI-RNTI, RA-RNTI, P-RNTI, and SI-RNTI.

If the network side equipment configures the type of the recovery search space on the CORESET-BFR as common, at this time, for the DCI that is sent, as the response information for the beam failure recovery request, to the user equipment by the network side equipment using the dedicated PDCCH on the CORESET-BFR, the network side equipment will not use CS-RNTI, TC-RNTI, SP-CSI-RNTI, RA-RNTI, P-RNTI, or SI-RNTI to scramble the CRC in the DCI. Therefore, the user equipment monitors C-RNTI, but does not monitor CS-RNTI, TC-RNTI, SP-CSI-RNTI, RA-RNTI, P-RNTI, and SI-RNTI.

It should be noted that, in addition to monitoring C-RNTI and not monitoring CS-RNTI, TC-RNTI, SP-CSI-RNTI, RA-RNTI, P-RNTI, and SI-RNTI, the user equipment may also perform monitoring on one or more of other RNTIs, which is not specifically limited here.

Among them, other RNTIs include at least one of the following: INT-RNTI, SFI-RNTI, TPC-SRS-RNTI, and I-RNTI.

By flexibly configuring the type of recovery search space on the CORESET-BFR, more types of RNTIs can be used to scramble the CRC in the DCI when the network side equipment uses the dedicated PDCCH on the CORESET-BFR to send to the user equipment the DCI as the response information for beam failure recovery request.

In one embodiment, the method further includes:

the user equipment cannot monitor the CORESET on the Secondary Cell (Scell).

In practical applications, the initial BWP is a BWP configured on the Primary Cell (Pcell).

When the user equipment monitors on the Pcell the CORESET-BFR on the initial BWP, it cannot monitor the CORESET on the Scell.

When the user equipment monitors on the Pcell the CORESET-BFR on the initial BWP, it cannot switch to the Scell to monitor the CORESET on the Scell.

In another embodiment, the method further includes:

monitoring the CORESET on the Scell.

When the user equipment monitors on the Pcell the CORESET-BFR on the initial BWP, it can monitor the CORESET on the Scell according to CORESET-related information configured on the Scell by the network side equipment.

When the user equipment monitors on the Pcell the CORESET-BFR on the initial BWP, it can switch to the Scell to monitor the CORESET on the Scell according to CORESET-related information configured on the Scell by the network side equipment.

It should be noted that, the CORESET-related information may be time-frequency domain information, spatial domain information, or other parameter information, which is not specifically limited here.

Type 3:

In an embodiment of the present disclosure, the method further includes:

switching to the initial bandwidth part (initial BWP).

In practical applications, the initial BWP is a BWP configured for the user equipment by the network side equipment and used when the user equipment initially accesses to the network side equipment.

Since the network side equipment does not configure the CORESET-BFR for the active BWP, the user equipment may switch from the active BWP to the initial BWP, thereby achieving beam failure recovery on the initial BWP.

In an embodiment of the present disclosure, when the CORESET-BFR is not configured on the initial BWP, and the contention-based PRACH is configured on the initial BWP, the target channel resource is the contention-based PRACH.

Since the network side equipment does not configure the CORESET-BFR for the initial BWP, the user equipment does not use on the initial BWP the contention-free PRACH to send the BFRQ to the network side equipment regardless of whether the network side equipment configures the contention-free PRACH for the initial BWP.

If the network side equipment does not configure CORESET-BFR for the initial BWP, but configures the contention-based PRACH for the initial BWP, at this time, the user equipment uses on the initial BWP the contention-based PRACH to send the BFRQ to the network side equipment.

In one embodiment, the method further includes:

monitoring, on the initial BWP, CORESET #0 on the initial BWP.

After the network side equipment receives the BFRQ sent on the initial BWP by the user equipment using the contention-based PRACH, the network side equipment sends a response information for the beam failure recovery request to the user equipment on the CORESET #0 configured for the initial BWP.

The user equipment monitors the CORESET #0 on the initial BWP, and if it receives the response information for the beam failure recovery request sent by the network side equipment, the beam failure recovery is successful, thereby recovering data transmission.

In another embodiment, the method further includes:

receiving, on the initial BWP, a RAR.

After the network side equipment receives the BFRQ sent on the initial BWP by the user equipment using the contention-based PRACH, the network side equipment returns the RAR, so that the user equipment can reconnect to the network side equipment after receiving the RAR, thereby achieving the beam failure recovery and making data transmission recovery possible.

It should be noted that, the RAR may be received on the CORESET #0 on the initial BWP, or may be received on other CORESETs on the initial BWP, which is not specifically limited here.

According to the technique solution recited in the embodiment of the present disclosure, when the user equipment detects on the active BWP an occurrence of a beam failure event and the CORESET-BFR is not configured on the active BWP, the user equipment uses a target channel resource to quickly send a BFRQ, thereby achieving beam failure recovery when the CORESET-BFR is not configured on the active BWP, and ensuring the recovery of data transmission.

FIG. 3 is a flow diagram of a method for beam failure recovery provided by an embodiment of the present disclosure. The method is applied to a user equipment, and the method may be as follows:

Step 310, when the user equipment detects on an active BWP an occurrence of a beam failure event, and PRACH is not configured on the active BWP, sending a BFRQ by using a target channel resource.

In practical applications, the network side equipment configures a BFD RS for the user equipment, so that the user equipment can determine whether a beam failure event occurs by measuring the BFD RS at the physical layer.

Since the network side equipment does not configure the PRACH for the active BWP, the user equipment does not perform beam failure recovery on the active BWP regardless of whether the network side equipment configures the CORESET-BFR for the active BWP, that is, the user equipment does not send the BFRQ on the active BWP.

In an embodiment of the present disclosure, candidate beam reference signals are not configured on the active BWP.

Since the network side equipment does not configure the PRACH for the active BWP, the user equipment does not perform beam failure recovery on the active BWP, and thus, the user equipment does not expect the network side equipment to configure the candidate beam reference signals for the active BWP.

In an embodiment of the present disclosure, the method further includes:

switching to the initial BWP.

In order to recovery data transmission as soon as possible, the user equipment switches to the initial BWP and performs beam failure recovery on the initial BWP, that is, uses the target channel resource on the initial BWP to send a BFRQ to the network side equipment.

The forms of target channel resource include at least the following two types.

Type 1:

In an embodiment of the present disclosure, the CORESET-BFR is configured on the initial BWP, and a contention-free PRACH is configured on the initial BWP, the target channel resource is the contention-free PRACH.

If the network side equipment configures both the CORESET-BFR and the contention-free PRACH for the initial BWP, at this time the user equipment uses on the initial BWP the contention-free PRACH to send the BFRQ to the network side equipment.

In an embodiment of the present disclosure, the method further includes:

monitoring, on the initial BWP, the CORESET-BFR.

After the network side equipment receives the BFRQ sent on the initial BWP by the user equipment using the contention-free PRACH, the network side equipment uses, on the CORESET-BFR configured for the initial BWP, the dedicated PDCCH on the CORESET-BFR to send response information for beam failure recovery request to the user equipment.

The user equipment monitors on the initial BWP the CORESET-BFR, and if it receives the response information for beam failure recovery request to the user equipment sent by the network side equipment, the beam failure recovery is successful, thereby recovering data transmission.

In an embodiment of the present disclosure, candidate beam reference signals are configured on the initial BWP;

Before monitoring the CORESET-BFR, the method further includes:
  determining a target beam reference signal for beam failure recovery according to the candidate beam reference signals, wherein the CORESET-BFR and the target beam reference signal are Quasi-colocated (QCL).

The network side equipment configures the candidate beam reference signals for the initial BWP, and the user equipment determines the target beam reference signal for beam failure recovery from the candidate beam reference signals, wherein the CORESET-BFR and the target beam reference signal are QCL.

The user equipment uses the contention-free PRACH associated with the target beam reference signal to send the BFRQ to the network side equipment, and the network side equipment can learn the target beam reference signal determined by the user equipment according to the received contention-free PRACH. Since the CORESET-BFR and the target beam reference signal are QCL, the network side equipment can determine the QCL information of the CORESET-BFR, and then use the dedicated PDCCH on the CORESET-BFR to send the response information for beam failure recovery request to the user equipment according to the QCL information of the CORESET-BFR.

Since the CORESET-BFR and the target beam reference signal are QCL, the user equipment can determine the QCL information of the CORESET-BFR according to the target beam reference signal, and then the user equipment monitors on the initial BWP the CORESET-BFR according to the QCL information of the CORESET-BFR and receives, on the dedicated PDCCH on the CORESET-BFR, the response information for beam failure recovery request to the user equipment sent by the network side equipment.

In an embodiment of the present disclosure, a type of a recovery search space on the CORESET-BFR is UE-specific.

In an embodiment of the present disclosure, a type of a recovery search space on the CORESET-BFR is common.

In one embodiment, the network side equipment configures CORESET-BFR for the initial BWP, and the type of the recovery search space on the CORESET-BFR can only be configured as UE-Specific.

In another embodiment, the network side equipment configures the CORESET-BFR for the initial BWP, and the type of the recovery search space on the CORESET-BFR may be selected from UE-specific and common so that the type of the recovery search space on the CORESET-BFR is configured as either UE-specific or common.

In an embodiment of the present disclosure, the method further includes:
  monitoring target RNTI, wherein the target RNTI includes: C-RNTI.

The network side equipment uses a dedicated PDCCH on the CORESET-BFR to send DCI to the user equipment, the DCI is the response information for the beam failure recovery request. When sending this DCI, the network side equipment will use a certain RNTI to scramble the CRC in the DCI. The user equipment monitors the RNTI that may be used by the network side equipment (target RNTI), and uses the target RNTI to descramble the received DCI.

Wherein the target RNTI is one or more RNTIs including C-RNTI.

In one embodiment, if the type of the recovery search space on the CORESET-BFR is UE-specific, the target RNTI does not includes: CS-RNTI, TC-RNTI, SP-CSI-RNTI.

If the network side equipment configures the type of the recovery search space on the CORESET-BFR as UE-specific, at this time, for the DCI that is sent, as the response information for the beam failure recovery request, to the user equipment by the network side equipment using the dedicated PDCCH on the CORESET-BFR, the network side equipment will not use CS-RNTI, TC-RNTI, or SP-CSI-RNTI to scramble the CRC in the DCI. Therefore, the user equipment monitors C-RNTI, but does not monitor CS-RNTI, TC-RNTI, and SP-CSI-RNTI.

It should be noted that, in addition to monitoring C-RNTI and not monitoring CS-RNTI, TC-RNTI, SP-CSI-RNTI, the user equipment may also perform monitoring on one or more of other RNTIs, which is not specifically limited here.

Among them, other RNTIs include at least one of the following: RA-RNTI, P-RNTI, SI-RNTI, INT-RNTI, SFI-RNTI), TPC-SRS-RNTI, I-RNTI.

In another embodiment, if the type of the recovery search space on the CORESET-BFR is common, the target RNTI does not includes: CS-RNTI, TC-RNTI, SP-CSI-RNTI, RA-RNTI, P-RNTI, and SI-RNTI.

If the network side equipment configures the type of the recovery search space on the CORESET-BFR as common, at this time, for the DCI that is sent, as the response information for the beam failure recovery request, to the user equipment by the network side equipment using the dedicated PDCCH on the CORESET-BFR, the network side equipment will not use CS-RNTI, TC-RNTI, SP-CSI-RNTI, RA-RNTI, P-RNTI, or SI-RNTI to scramble the CRC in the DCI. Therefore, the user equipment monitors C-RNTI, but does not monitor CS-RNTI, TC-RNTI, SP-CSI-RNTI, RA-RNTI, P-RNTI, and SI-RNTI.

It should be noted that, in addition to monitoring C-RNTI and not monitoring CS-RNTI, TC-RNTI, SP-CSI-RNTI, RA-RNTI, P-RNTI, and SI-RNTI, the user equipment may also perform monitoring on one or more of other RNTIs, which is not specifically limited here.

Among them, other RNTIs include at least one of the following: INT-RNTI, SFI-RNTI, TPC-SRS-RNTI, and I-RNTI.

By flexibly configuring the type of recovery search space on the CORESET-BFR, more types of RNTIs can be used to scramble the CRC in the DCI when the network side equipment uses the dedicated PDCCH on the CORESET-BFR to send to the user equipment the DCI as the response information for beam failure recovery request.

In one embodiment, the method further includes:
  the user equipment cannot monitor the CORESET on the Scell.

In practical applications, the initial BWP is a BWP configured on the Pcell.

When the user equipment monitors, on the Pcell, the CORESET-BFR on the initial BWP, it cannot monitor the CORESET on the Scell.

When the user equipment monitors, on the Pcell, the CORESET-BFR on the initial BWP, it cannot switch to the Scell to monitor the CORESET on the Scell.

In another embodiment, the method further includes:
  monitoring the CORESET on the Scell.

When the user equipment monitors on the Pcell the CORESET-BFR on the initial BWP, it can monitor the CORESET on the Scell according to CORESET-related information configured on the Scell by the network side equipment.

When the user equipment monitors on the Pcell the CORESET-BFR on the initial BWP, it can switch to the Scell to monitor the CORESET on the Scell according to CORESET-related information configured on the Scell by the network side equipment.

It should be noted that, the CORESET-related information may be time-frequency domain information, spatial domain information, or other parameter information, which is not specifically limited here.

Type 2:

In an embodiment of the present disclosure, when the CORESET-BFR is not configured on the initial BWP, and the contention-based PRACH is configured on the initial BWP, the target channel resource is the contention-based PRACH.

Since the network side does not configure the CORESET-BFR for the initial BWP, the user equipment does not use on the initial BWP the contention-free PRACH to send the BFRQ to the network side equipment regardless of whether the network side equipment configures the contention-free PRACH for the initial BWP.

If the network side does not configure the CORESET-BFR for the initial BWP, but configures the contention-based PRACH for the initial BWP, at this time, the user equipment uses on the initial BWP the contention BWP to send the BFRQ to the network side equipment.

In one embodiment, the method further includes:
monitoring, on the initial BWP, CORESET #0 on the initial BWP.

After the network side equipment receives the BFRQ sent on the initial BWP by the user equipment using the contention-based PRACH, the network side equipment sends a response information for the beam failure recovery request to the user equipment on the CORESET #0 configured for the initial BWP.

The user equipment monitors the CORESET #0 on the initial BWP, and if it receives the response information for the beam failure recovery request sent by the network side equipment, the beam failure recovery is successful, thereby recovering data transmission.

In an embodiment of the present disclosure, before monitoring the CORESET #0, the method further includes:
determining a target Synchronization Signal Block (SSB), wherein the CORESET #0 and the target SSB are QCL.

Before monitoring the CORESET #0, the user equipment sends multiple SSBs, and determines one target SSB from the multiple SSBs, wherein the CORESET #0 and the target SSB are QCL.

For example, the user equipment selects an SSB with a receiving power meeting a preset condition from the multiple SSBs as the target SSB; or, the user equipment selects an SSB with a signal to interference plus noise ratio meeting a preset condition from the multiple SSBs as the target SSB; or,
the user equipment selects an SSB with a block error rate meeting a preset condition from the multiple SSBs as the target SSB.

It should be noted that, in addition to determining the target SSB from multiple SSBs according to the receiving power or the signal to interference plus noise ratio or the block error rate, the user equipment can determine the target SSB from multiple SSBs according to other parameters, which is not limited here.

Since the CORESET #0 and the target SSB are QCL, the user equipment may determine the QCL information of the CORESET #0 according to the target SSB, and then the user equipment monitors, on the initial BWP, the CORESET #0 according to the QCL information of the CORESET #0, that is, the user equipment monitors CORESET #0 in a beam direction corresponding to the SSB, and receives, on the CORESET #0, the response information for the beam failure recovery request sent by the network side equipment.

In another embodiment, the method further includes:
receiving, on the initial BWP, a RAR.

After the network side equipment receives the BFRQ sent on the initial BWP by the user equipment using the contention-based PRACH, the network side equipment returns the RAR, so that the user equipment can reconnect to the network side equipment after receiving the RAR, thereby achieving the beam failure recovery and making data transmission recovery possible.

It should be noted that, the RAR may be received on the CORESET #0 on the initial BWP, or may be received on other CORESETs on the initial BWP, which is not specifically limited here.

According to the technique solution recited in the embodiment of the present disclosure, when the user equipment detects on the active BWP an occurrence of a beam failure event and PRACH is not configured on the active BWP, the user equipment uses a target channel resource to quickly send a BFRQ, thereby achieving beam failure recovery when PRACH is not configured on the active BWP, and ensuring the recovery of data transmission.

FIG. 4 is a flow diagram of a method for beam failure recovery provided by an embodiment of the present disclosure. The method is applied to a user equipment, and the method may be as follows.

Step 410, monitoring CORESET-BFR on a first cell, wherein a type of a recovery search space on the CORESET-BFR is a target type.

When the user equipment performs beam failure recovery on the first cell, the user equipment monitors CORESET-BFR on the first cell if the network side equipment configures the CORESET-BFR for the first cell. Wherein, the type of the recovery search space on the CORESET-BFR configured by the network side equipment for the first cell is the target type.

In an embodiment of the present disclosure, the target type is UE-specific.

In an embodiment of the present disclosure, the target type is common.

In one embodiment, the network side equipment configures the CORESET-BFR for the first cell, and the type of the recovery search space on the CORESET-BFR can only be configured as UE-specific.

In another embodiment, the network side equipment configures the CORESET-BFR for the first cell, and the type of the recovery search space on the CORESET-BFR may be selected from UE-specific and common so that the type of the recovery search space on the CORESET-BFR is configured as either UE-specific or common.

In an embodiment of the present disclosure, the method further includes:
monitoring target RNTI, wherein the target RNTI includes: C-RNTI.

The network side equipment uses a dedicated PDCCH on the CORESET-BFR to send DCI to the user equipment, wherein the DCI is the response information for the beam failure recovery request. When sending this DCI, the network side equipment will use a certain RNTI to scramble the CRC in the DCI. The user equipment monitors the RNTI that may be used by the network side equipment (target RNTI), and uses the target RNTI to descramble the received DCI.

Wherein the target RNTI is one or more RNTIs including C-RNTI.

In one embodiment, if the type of the recovery search space on the CORESET-BFR is UE-specific, the target RNTI does not includes: CS-RNTI, TC-RNTI, SP-CSI-RNTI.

If the network side equipment configures the type of the recovery search space on the CORESET-BFR as UE-specific, at this time, for the DCI that is sent, as the response information for the beam failure recovery request, to the user equipment by the network side equipment using the dedicated PDCCH on the CORESET-BFR, the network side equipment may not use CS-RNTI, TC-RNTI, or SP-CSI-RNTI to scramble the CRC in the DCI. Therefore, the user equipment monitors C-RNTI, but does not monitor CS-RNTI, TC-RNTI, and SP-CSI-RNTI.

It should be noted that, in addition to monitoring C-RNTI and not monitoring CS-RNTI, TC-RNTI, SP-CSI-RNTI, the user equipment may also perform monitoring on one or more of other RNTIs, which is not specifically limited here.

Among them, other RNTIs include at least one of the following: RA-RNTI, P-RNTI, SI-RNTI, INT-RNTI, SFI-RNTI, TPC-SRS-RNTI, I-RNTI.

In another embodiment, if the type of the recovery search space on the CORESET-BFR is common, the target RNTI does not includes: CS-RNTI, TC-RNTI, SP-CSI-RNTI, RA-RNTI, P-RNTI, and SI-RNTI.

If the network side equipment configures the type of the recovery search space on the CORESET-BFR as common, at this time, for the DCI that is sent, as the response information for the beam failure recovery request, to the user equipment by the network side equipment using the dedicated PDCCH on the CORESET-BFR, the network side equipment will not use CS-RNTI, TC-RNTI, SP-CSI-RNTI, RA-RNTI, P-RNTI, or SI-RNTI to scramble the CRC in the DCI. Therefore, the user equipment monitors C-RNTI, but does not monitor CS-RNTI, TC-RNTI, SP-CSI-RNTI, RA-RNTI, P-RNTI, and SI-RNTI.

It should be noted that, in addition to monitoring C-RNTI and not monitoring CS-RNTI, TC-RNTI, SP-CSI-RNTI, RA-RNTI, P-RNTI, and SI-RNTI, the user equipment may also perform monitoring on one or more of other RNTIs, which is not specifically limited here.

Among them, other RNTIs include at least one of the following: INT-RNTI, SFI-RNTI, TPC-SRS-RNTI, and I-RNTI.

By flexibly configuring the type of recovery search space on the CORESET-BFR, more types of RNTIs can be used to scramble the CRC in the DCI when the network side equipment uses the dedicated PDCCH on the CORESET-BFR to send to the user equipment the DCI as the response information for beam failure recovery request.

In an embodiment of the present disclosure, the user equipment cannot monitor the CORESET on the Scell.

If the first cell is Pcell, that is, when the user equipment monitors the CORESET-BFR on the Pcell, the user equipment cannot monitor the CORESET on the Scell.

When the user equipment monitors the CORESET-BFR on the Pcell, the user equipment cannot switch to the Scell to monitor the CORESET on the Scell.

In an embodiment of the present disclosure, the method further includes:

monitoring the CORESET on a second cell.

In one embodiment, the first cell is the Pcell, and the second cell is the Scell.

When monitoring the CORESET-BFR on the Pcell, the user equipment may monitor the CORESET on the Scell according to CORESET-related information configured by the network side equipment on the Scell.

When monitoring the CORESET-BFR on the Pcell, the user equipment may switch to the Scell to monitor the CORESET on the Scell according to the CORESET-related information configured by the network side equipment on the Scell.

In one embodiment, the first cell is a first Scell, the second cell is a Pcell or a second Scell, wherein the second Scell is a Scell other than the first Scell.

When monitoring the CORESET-BFR on the first Scell, the user equipment may monitor the CORESET on the Pcell according to the CORESET-related information configured by the network side equipment on the Pcell; or, When monitoring the CORESET-BFR on the first Scell, the user equipment may monitor the CORESET on the second Scell according to the CORESET-related information configured by the network side equipment on the second Scell.

When monitoring the CORESET-BFR on the first Scell, the user equipment may switch to the Pcell to monitor the CORESET on the Pcell according to the CORESET-related information configured by the network side equipment on the Pcell.

When monitoring the CORESET-BFR on the first Scell, the user equipment may switch to the second Scell to monitor the CORESET on the second Scell according to the CORESET-related information configured by the network side equipment on the second Scell.

It should be noted that, the CORESET-related information may be time-frequency domain information, spatial domain information, or other parameter information, which is not specifically limited here.

An embodiment of the present disclosure further provides a CORESET configuration method. The method is applied to a user equipment, and the method may include at least the following two:

The first: receiving configuration information of a first CORESET sent by the network side equipment, wherein the first CORESET is a CORESET newly configured for the user equipment by the network side equipment, which includes at least one Transmission Configuration Indication State (TCI state).

In one embodiment, the configuration information of the first CORESET includes one TCI state, the user equipment determines QCL information of the first CORESET according to this TCI state, and then monitors the first CORESET according to the QCL information of the first CORESET.

In another embodiment, the configuration information of the first CORESET includes multiple TCI states, the user equipment receives Medium Access Control layer Control Element (MAC CE) signaling sent by the network side equipment. The MAC CE is used to activate a target TCI state among the multiple TCI states.

The user equipment activates the target TCI state according to the MAC CE signaling, and determines the QCL information of the first CORESET, and then monitors the first CORESET according to the QCL information of the first CORESET.

Before the network side equipment activates the target TCI state through the MAC CE signaling, the user equipment does not expect to monitor the first CORESET.

The second: receiving configuration information of a second CORESET sent by the network side equipment, wherein the second CORESET is a CORESET having been configured for the user equipment by the network side equipment, the configuration information of the second CORESET is configuration information reconfigured for the second CORESET by the network side equipment, and the configuration information of the second CORESET includes at least one TCI state.

In one embodiment, the configuration information of the second CORESET includes one TCI state, the user equipment determines QCL information of the second CORESET according to this TCI state, and then monitors the second CORESET according to the QCL information of the second CORESET.

In another embodiment, the configuration information of the second CORESET includes multiple TCI states, the user equipment receives MAC CE signaling. The MAC CE is used to activate a target TCI state among the multiple TCI states.

The user equipment activates the target TCI state according to the MAC CE signaling, and determines the QCL information of the second CORESET, and then monitors the second CORESET according to the QCL information of the second CORESET.

Before the network side equipment activates the target TCI state through the MAC CE signaling, the user equipment monitors by default the second CORESET according to the QCL information before the reconfiguration of the second CORESET, that is, according to the QCI information indicated by the TCI state activated by the last MAC CE signaling.

FIG. 5 is a structural diagram of a user equipment provided by an embodiment of the present disclosure. The user equipment 500 shown in FIG. 5 includes:
  a sending module 501 configured to, when the user equipment 500 detects on an active BWP an occurrence of a beam failure event and CORESET-BFR is not configured on the active BWP, send a BFRQ by using a target channel resource.

Optionally, the target channel resource is a channel resource other than the contention-free PRACH.

Optionally, when a contention-based PRACH is configured on the active BWP, the target channel resource is the contention-based PRACH.

Optionally, the user equipment 500 further includes:
  a reception module configured to receive, on an active BWP, a RAR.

Optionally, the sending module 501 further includes:
  a switching unit configured to switch to an initial BWP.

Optionally, when CORESET-BFR is configured on the initial BWP, and a contention-free PRACH is configured on the initial BWP, the target channel resource is the contention-free PRACH.

Optionally, the user equipment 500 further includes:
  a monitor module configured to monitor on the initial BWP the CORESET-BFR.

Optionally, when the CORESET-BFR is not configured on the initial BWP, and a contention-based PRACH is configured on the initial BWP, the target channel resource is the contention-based PRACH.

Optionally, the monitoring module is further configured to:
  monitor, on the initial BWP, CORESET #0 on the initial BWP.

Optionally, the reception module is further configured to:
  receive, on the initial BWP, the RAR.

Optionally, a type of a recovery search space on the CORESET-BFR is UE-specific.

Optionally, the type of the recovery search space on the CORESET-BFR is common.

Optionally, the monitor module is further configured to:
  monitor a target RNTI, wherein the target RNTI includes: C-RNTI.

Optionally, if the type of the recovery search space on the CORESET-BFR is UE-specific, the target RNTI does not includes: CS-RNTI, TC-RNTI, SP-CSI-RNTI.

Optionally, if the type of the recovery search space on the CORESET-BFR is common, the target RNTI does not includes: CS-RNTI, TC-RNTI, SP-CSI-RNTI, RA-RNTI, P-RNTI, and SI-RNTI.

Optionally, the monitor module is further configured to:
  monitoring the CORESET on the Scell.

The user equipment 500 provided by the embodiment of the present disclosure can implement the processes implemented by the user equipment in the method embodiment of FIG. 2. To avoid repetition, details are not described herein again.

Figure 6:
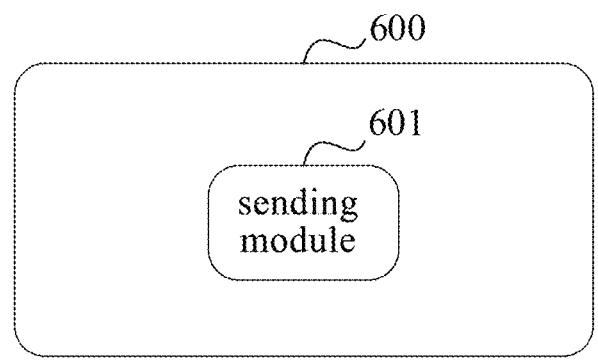
FIG. 6 is a structural diagram of another user equipment provided by an embodiment of the present disclosure.

FIG. 6 is a structural diagram of another user equipment provided by an embodiment of the present disclosure. The user equipment 600 shown in FIG. 6 includes:
  a sending module 601 configured to, when the user equipment 600 detects on an active BWP an occurrence of a beam failure event and the CORESET-BFR is not configured on the active BWP, send a BFRQ by using a target channel resource.

Optionally, the sending module 601 further includes:
  a switching unit configured to switch to an initial BWP.

Optionally, when CORESET-BFR is configured on the initial BWP, and a contention-free PRACH is configured on the initial BWP, the target channel resource is the contention-free PRACH.

Optionally, the user equipment 600 further includes:
  a monitor module configured to monitor on the initial BWP the CORESET-BFR.

Optionally, when the CORESET-BFR is not configured on the initial BWP, and a contention-based PRACH is configured on the initial BWP, the target channel resource is the contention-based PRACH.

Optionally, the monitoring module is further configured to:
  monitor, on the initial BWP, CORESET #0 on the initial BWP.

Optionally, the user equipment 600 further includes:
  a reception module configured to receive, on the initial BWP, a RAR.

Optionally, a type of a recovery search space on the CORESET-BFR is UE-specific.

Optionally, the type of the recovery search space on the CORESET-BFR is common.

Optionally, the monitor module is further configured to:
  monitor a target RNTI, wherein the target RNTI includes: C-RNTI.

Optionally, if the type of the recovery search space on the CORESET-BFR is UE-specific, the target RNTI does not includes: CS-RNTI, TC-RNTI, SP-CSI-RNTI.

Optionally, if the type of the recovery search space on the CORESET-BFR is common, the target RNTI does not includes: CS-RNTI, TC-RNTI, SP-CSI-RNTI, RA-RNTI, P-RNTI, and SI-RNTI.

Optionally, the monitor module is further configured to:
  monitoring the CORESET on the Scell.

Optionally, candidate beam reference signals are not configured on the active BWP.

Optionally, candidate beam reference signals are configured on the initial BWP.

The sending module 601 is further configured to:
determine a target beam reference signal for beam failure recovery according to the candidate beam reference signals, wherein the CORESET-BFR and the target beam reference signal are QCL.

The user equipment 600 provided by the embodiment of the present disclosure can implement the processes implemented by the user equipment in the method embodiment of FIG. 3. To avoid repetition, details are not described herein again.

Figure 7:
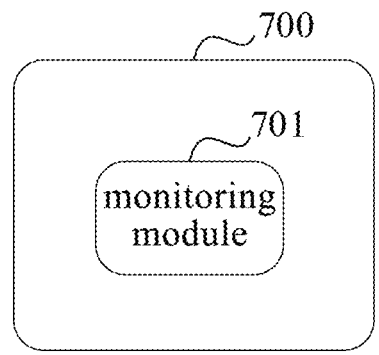
FIG. 7 is a structural diagram of another user equipment provided by an embodiment of the present disclosure.

FIG. 7 is a structural diagram of another user equipment provided by an embodiment of the present disclosure. The user equipment shown in FIG. 7 includes:
a monitor module 701 configured to monitor CORESET-BFR on a first cell, wherein a type of a recovery search space on the CORESET-BFR is a target type.

Optionally, the target type is user equipment-specific (UE-specific).

Optionally, the target type is common.

Optionally, the monitor module 701 is further configured to:
monitor a target RNTI, wherein the target RNTI includes: C-RNTI.

Optionally, if the type of the recovery search space on the CORESET-BFR is UE-specific, the target RNTI does not includes: CS-RNTI, TC-RNTI, SP-CSI-RNTI.

Optionally, if the type of the recovery search space on the CORESET-BFR is common, the target RNTI does not includes: CS-RNTI, TC-RNTI, SP-CSI-RNTI, RA-RNTI, P-RNTI, and SI-RNTI.

Optionally, the monitor module 701 is further configured to:
monitor the CORESET on a second cell.

Optionally, the first cell is the Pcell, and the second cell is the Scell.

The user equipment 700 provided by the embodiment of the present disclosure can implement the processes implemented by the user equipment in the method embodiment of FIG. 4. To avoid repetition, details are not described herein again.

Figure 8:
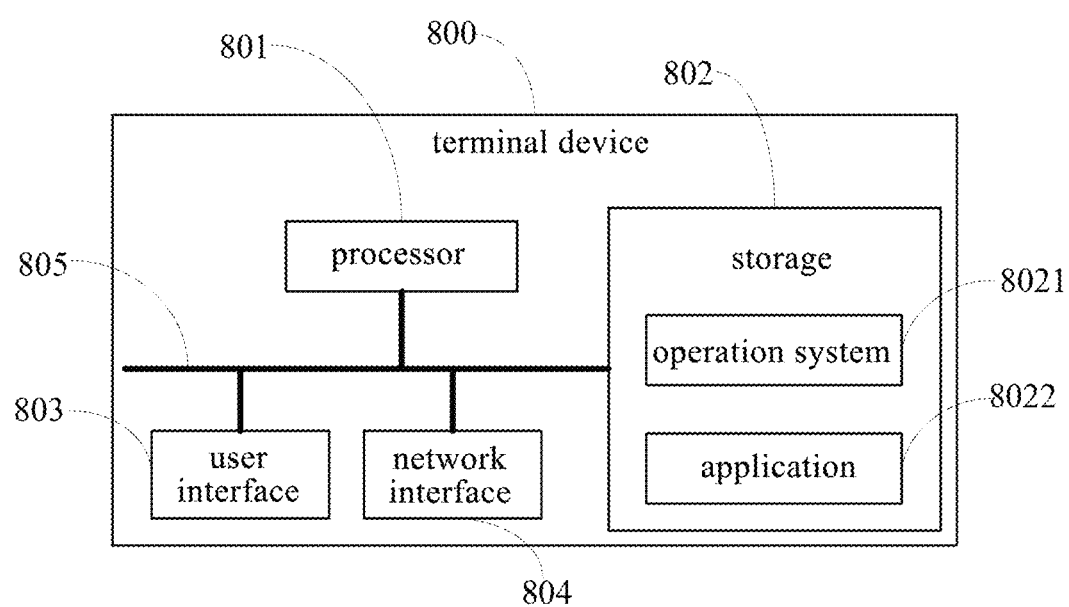
FIG. 8 is a structural diagram of another user equipment provided by an embodiment of the present disclosure.

FIG. 8 is a structural diagram of another user equipment provided by an embodiment of the present disclosure. The user equipment 800 shown in FIG. 8 includes: at least one processor 801, a storage 802, at least one network interface 804, and a user interface 803. The components in the user equipment 800 are couple with each other through a bus system 805. It will be appreciated, the bus system 805 is used to achieve the connection and communication between these components. In addition to a data bus, the bus system 805 also includes a power bus, a control bus and a status signal bus. However, for the sake of clarity, various buses are marked as the bus system 805 in FIG. 8.

Wherein, the user interface 803 may include a display, a keyboard, or a pointing device (for example, a mouse, a trackball, a touch panel, or a touch screen, etc.).

It will be appreciated that, the storage 802 in the embodiment of the present disclosure may be a volatile memory or a non-volatile memory, or may include both volatile and non-volatile memory. Among them, the non-volatile memory can be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synch link DRAM (SLDRAM) and a Direct Rambus RAM (DRRAM). The storage 802 of the system and method described in the embodiment of the present disclosure is intended to include, but is not limited to, these and any other suitable types of storages.

In some embodiments, the storage 802 stores the following elements, executable modules or data structures, or a subset of them, or an extended set of them: an operating system 8021 and an application 8022.

Among them, the operating system 8021 includes various system programs, such as a framework layer, a core library layer, a driver layer, etc., for implementing various basic services and processing hardware-based tasks. The application 8022 includes various application programs, such as a media player, a browser, etc., for implementing various application services. The program for implementing the methods of the embodiments of the present disclosure may be included in the application 8022.

In an embodiment of the present disclosure, the user equipment 800 further includes: a computer program stored on the storage 802 and capable of running on the processor 801, the computer program implementing, when executed by the processor 801, the steps:
when the user equipment 800 detects on an active BWP an occurrence of a beam failure event, and CORESET-BFR is not configured on the active BWP, sending a BFRQ by using a target channel resource; or,
when the user equipment 800 detects on the active BWP an occurrence of a beam failure event, and PRACH is not configured on the active BWP, sending a BFRQ by using a target channel resource; or,
monitoring the CORESET-BFR on a first cell, wherein a type of a recovery search space on the CORESET-BFR is a target type.

The methods disclosed in the foregoing embodiments of the present disclosure may be applied to the processor 801 or implemented by the processor 801. The processor 801 may be an integrated circuit chip with signal processing capability.

In the implementation process, the steps of the foregoing methods may be performed by an integrated logic circuit of hardware in the processor 801 or instructions in the form of software. The above processor 801 may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The methods, steps, and logical block diagrams disclosed in the embodiments of the present disclosure can be implemented or executed. The general-purpose processor may be a microprocessor or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software modules may be located in a computer readable storage medium mature in the field, such as a random access memory, a flash memory, a read-only memory, a programmable read-only memory, or an electrically erasable programmable memory, a register, etc. The computer readable storage medium is located in the storage 802, and the processor 801 reads the information in the storage 802, and performs the steps of the foregoing methods in combination with its hardware. Specifically, a computer program is stored on the computer readable storage medium, and when the computer program is executed by the processor 801, the steps of any one of the method embodiments as shown in FIGS. 2, 3, and 4 are implemented.

It will be appreciated that, these embodiments described in the embodiments of the present disclosure can be implemented by hardware, software, firmware, middleware, microcodes, or a combination thereof. For hardware implementation, the processing unit may be implemented in one or more Application Specific Integrated Circuits (ASIC), Digital Signal Processors (DSPs), DSP Devices (DSPDs), Programmable Logic Devices (PLDs), Field-Programmable Gate Arrays (FPGA), general-purpose processors, controllers, microcontrollers, microprocessors, and other electronic units for performing the functions described in this disclosure, or a combination thereof.

For software implementation, the techniques described in the embodiments of the present disclosure can be implemented by modules (for example, processes, functions, etc.) that perform the functions described in the embodiments of the present disclosure. The software codes may be stored in the storage and executed by the processor. The storage may be implemented in the processor or external to the processor.

The user equipment 800 can implement the various processes implemented by the user equipments in the foregoing method embodiments of FIGS. 2, 3 and 4. To avoid repetition, details are not described herein again.

The embodiments of the present disclosure also provide a computer readable storage medium having a computer program stored thereon. When the computer program is executed by a processor, the processes of the forgoing method embodiments in FIGS. 2, 3, and 4 are implemented, and can achieve the same technical effects. In order to avoid repetition, details will not be repeated again here. Wherein, the computer readable storage medium may be such as a Read-Only Memory (ROM), a Random Access Memory (RAM), a magnetic disk, or an optical disk, etc.

What is claimed is:

1. A method for beam failure recovery, applied to a user equipment, comprising:
    sending a beam failure recovery request (BFRQ) by using a target channel resource in a case that the user equipment detects on an active bandwidth part (active BWP) of a Primary Cell (Pcell) an occurrence of a beam failure event and control resource set-beam failure recovery (CORESET-BFR) is not configured on the active BWP of the Pcell, the target channel resource is not a contention-free PRACH resource on the active BWP of the Pcell;
    wherein, in a case that a contention-based physical random access channel (PRACH) is configured on the active BWP of the Pcell, the target channel resource is the contention-based PRACH configured on the active BWP of the Pcell; and
    the method further comprises:
    switching to an initial bandwidth part (initial BWP) of the Pcell, and performing beam failure recovery on the initial BWP of the Pcell in a case that no PRACH is configured on the active BWP of the Pcell;
    wherein, in a case that the CORESET-BFR is configured on the initial BWP of the Pcell, and a contention-free PRACH is configured on the initial BWP of the Pcell, the target channel resource is the contention-free PRACH configured on the initial BWP of the Pcell; and
    wherein, in a case that the CORESET-BFR is not configured on the initial BWP of the Pcell, and a contention-based PRACH is configured on the initial BWP of the Pcell, the target channel resource is the contention-based PRACH configured on the initial BWP of the Pcell.

2. The method according to claim 1, further comprising:
    receiving, on the active BWP of the Pcell, a random access response (RAR).

3. The method according to claim 1, wherein a type of a search space for beam failure recovery (recovery search space) on the CORESET-BFR is user equipment-specific (UE-specific).

4. The method according to claim 3, further comprising:
    monitoring target radio network temporary identity (RNTI), wherein the target RNTI comprises cell radio network temporary identity (C-RNTI).

5. The method according to claim 1, further comprising:
    monitoring, on the initial BWP of the Pcell, CORESET #0 on the initial BWP of the Pcell.

6. The method according to claim 1, further comprising:
    receiving a random access response (RAR) on the initial BWP of the Pcell.

7. A user equipment, comprising: a storage, a processor, and a computer program stored on the storage and capable of running on the processor, wherein the computer program is executed by the processor to implement a method for beam failure recovery, the method comprises:
    switching to an initial bandwidth part (initial BWP) of a Primary Cell (Pcell) and sending a beam failure recovery request (BFRQ) by using a target channel resource in a case that the user equipment detects on an active bandwidth part (active BWP) of the Pcell an occurrence of a beam failure event, and a contention-based physical random access channel (PRACH) is not configured on the active BWP of the Pcell, the target channel resource is not a contention-free PRACH resource on the active BWP of the Pcell;
    wherein, in a case that control resource set-beam failure recovery (CORESET-BFR) is configured on the initial BWP of the Pcell and a contention-free PRACH is configured on the initial BWP of the Pcell, the target channel resource is the contention-free PRACH configured on the initial BWP of the Pcell; and
    in a case that CORESET-BFR is not configured on the initial BWP of the Pcell and a contention-based PRACH is configured on the initial BWP of the Pcell, the target channel resource is the contention-based PRACH configured on the initial BWP of the Pcell;
    wherein, in a case that the CORESET-BFR is not configured on the initial BWP of the Pcell, and a contention-based PRACH is configured on the initial BWP of the Pcell, the target channel resource is the contention-based PRACH configured on the initial BWP of the Pcell.

8. The user equipment according to claim 7, wherein the computer program is executed by the processor to further implement:
    receiving, on the initial BWP of the Pcell, a random access response (RAR).

9. The user equipment according to claim 7, wherein a type of a recovery search space on the CORESET-BFR is UE-specific.

10. The user equipment according to claim 9, wherein the computer program is executed by the processor to further implement:
    monitoring target RNTI, wherein the target RNTI comprises: C-RNTI.

11. The user equipment according to claim 7, wherein candidate beam reference signals are not configured on the initial BWP of the Pcell;
- before monitoring the CORESET-BFR, the computer program is executed by the processor to further implement:
- determining a target beam reference signal for beam failure recovery according to the candidate beam reference signals, wherein the CORESET-BFR and the target beam reference signal are Quasi-colocated (QCL).

12. The user equipment according to claim 7, wherein the computer program is executed by the processor to further implement:
- monitoring target radio network temporary identity (RNTI), wherein the target RNTI comprises cell radio network temporary identity (C-RNTI).

13. A user equipment, comprising: a storage, a processor, and a computer program stored on the storage and capable of being executed by the processor, wherein the computer program is executed by the processor to implement a method for beam failure recovery, the method comprises:
- sending a beam failure recovery request (BFRQ) by using a target channel resource when in a case that the user equipment detects on an active bandwidth part (active BWP) of a Primary Cell (Pcell) an occurrence of a beam failure event, and control resource set-beam failure recovery (CORESET-BFR) is not configured on the active BWP of the Pcell, the target channel resource is not a contention-free PRACH resource on the active BWP of the Pcell;
- wherein, in a case that a contention-based physical random access channel (PRACH) is configured on the active BWP, the target channel resource is the contention-based PRACH configured on the active BWP of the Pcell; and
- the computer program is executed by the processor to further implement:
- switching to an initial bandwidth part (initial BWP) of the Pcell, and performing beam failure recovery on the initial BWP of the Pcell in a case that no PRACH is configured on the active BWP of the Pcell;
- wherein in a case that the CORESET-BFR is configured on the initial BWP of the Pcell, and a contention-free PRACH is configured on the initial BWP of the Pcell, the target channel resource is the contention-free PRACH configured on the initial BWP of the Pcell; and
- wherein, in a case that the CORESET-BFR is not configured on the initial BWP, and a contention-based PRACH is configured on the initial BWP of the Pcell, the target channel resource is the contention-based PRACH configured on the initial BWP of the Pcell.

14. The user equipment according to claim 13, wherein the computer program is executed by the processor to further implement:
- receiving, on the active BWP of the Pcell, a random access response (RAR).

15. The user equipment according to claim 13, wherein a type of a search space for beam failure recovery (recovery search space) on the CORESET-BFR is user equipment-specific (UE-specific).

16. The user equipment according to claim 15, wherein the computer program is executed by the processor to further implement:
- monitoring target radio network temporary identity (RNTI), wherein the target RNTI comprises cell radio network temporary identity (C-RNTI).

17. The user equipment according to claim 13, wherein the computer program is executed by the processor to further implement:
- monitoring, on the initial BWP of the Pcell, CORESET #0 on the initial BWP of the Pcell.

18. The user equipment according to claim 13, wherein the computer program is executed by the processor to further implement:
- receiving a random access response (RAR) on the initial BWP of the Pcell.

\* \* \* \* \*